Nov. 17, 1931.  E. T. HARNEY  1,831,955
VARIABLE CLUTCH
Filed March 26, 1928
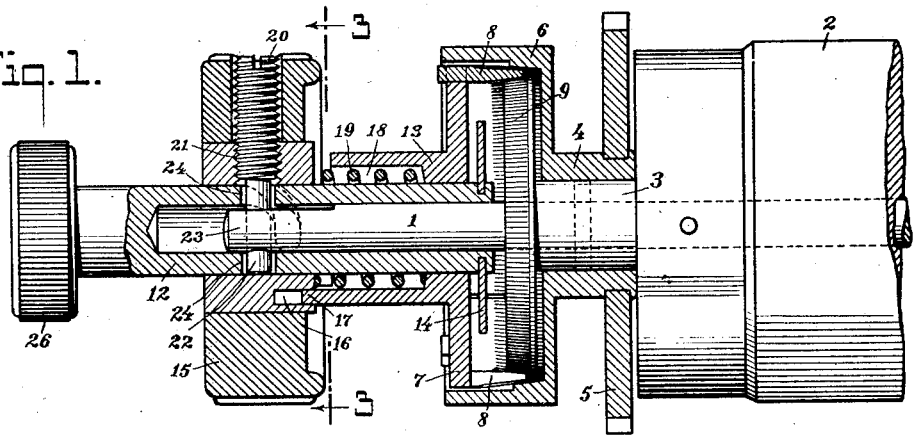
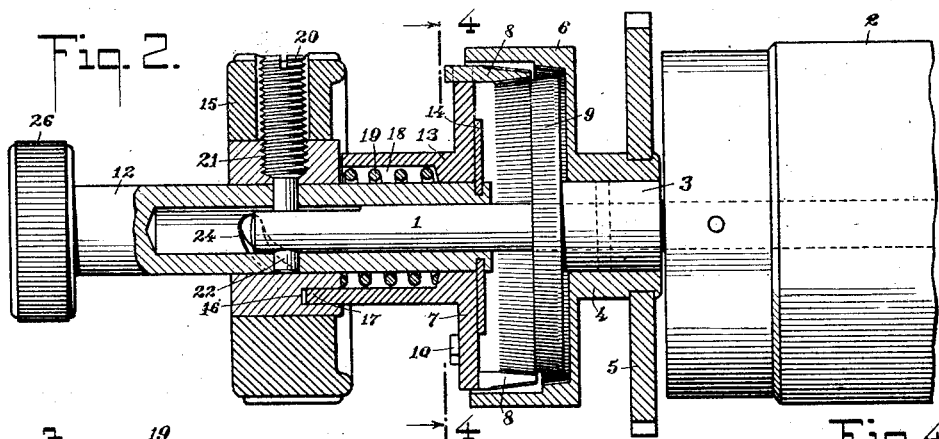
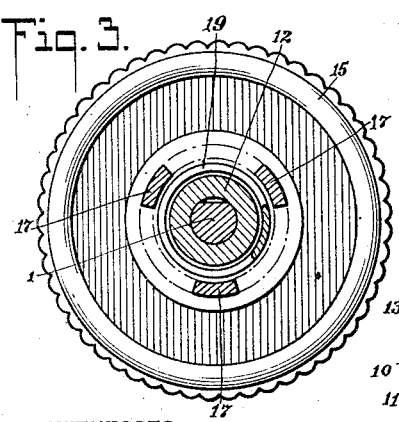
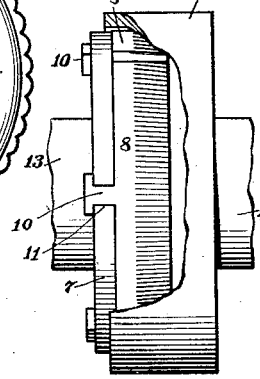
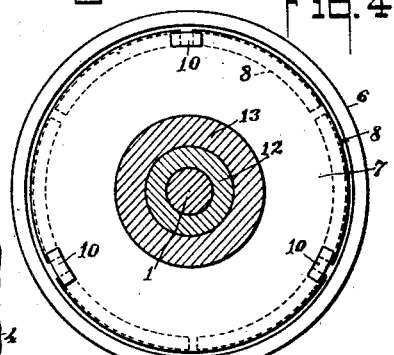
WITNESSES
INVENTOR
*Emmet T. Harney*
BY
ATTORNEY Patented Nov. 17, 1931

1,831,955

UNITED STATES PATENT OFFICE

EMMET T. HARNEY, OF GARWOOD, NEW JERSEY

VARIABLE CLUTCH

Application filed March 26, 1928. Serial No. 264,898.

This invention relates to variable clutches and more specifically the invention is directed to variable spacing means for typewriters and the like.

An object of the invention is to provide a novel, simple, efficient clutch associated with the cylinder or platen of a typewriter or the like, and improved means for controlling the operation of the clutch whereby the cylinder may be free from operative engagement with the ratchet wheel controlling the same so that the cylinder or platen may be freely turned as desired.

A further object is to provide a clutch mechanism of this character in which a partial turning movement of one member imparts a longitudinal movement to the clutch member to release the clutch, and a spring is employed to return the clutch member to holding position and maintain the same in such position when permitted.

Another object of the invention is to provide a typewriter clutch in which all of the cooperating clutch parts are provided with relatively fine teeth adapted to be interlocked to prevent any slipping of the clutch and adapted to be operated by a control arranged to be tortionally moved to effect the clutching and unclutching actions and in a manner that will insure against any endwise movement of the carriage so that line spacing operations can be effected by one hand alone without the necessity of employing the other hand for holding the carriage during the shifting of the clutch.

With these and other objects in view, the invention consists in certain novel features of construction and combinations and arrangements of parts, which will be more fully hereinafter described and pointed out in the claims.

In the accompanying drawings—

Figure 1 is a view, partly in elevation but mainly in longitudinal section, showing my improved clutch in locking or holding position;

Figure 2 is a view similar to Figure 1 showing the clutch members separated;

Figure 3 is a view in transverse section on the line 3—3 of Figure 1;

Figure 4 is a view in transverse section on the line 4—4 of Figure 2;

Figure 5 is a broken view in side elevation of the clutch.

1 represents a shaft on which the cylinder or platen 2 is secured. A sleeve 3 is pinned or otherwise secured to shaft 1 at one end of the cylinder 2, and a sleeve 4 is mounted to turn on the sleeve 3 and carries a ratchet wheel 5 to which motion is transmitted, in the ordinary manner, to turn the platen.

The sleeve 4 referred to carries a cylindrical cup-like clutch member 6, which may be integral therewith or fixed thereto in any approved manner. The open end of this clutch member 6 faces outwardly and receives therein a clutch member 7. The clutch member 7 constitutes a disk of smaller diameter than the internal diameter of the clutch member 6 and carries at its edge arcuate wedges 8 which are adapted to engage between the member 6 and a disk 9 located on the shaft 1.

This disk 9 is represented as contituting a part of the sleeve 3. The engaging faces of the shoes 8, the member 6 and disk 9 are beveled or inclined and they are provided with relatively fine teeth adapted to be interlocked, the teeth on the beveled inner faces of the shoes 8 being adapted to interlock with the teeth on the beveled periphery of the disk 9 while the teeth on the beveled outer faces of said shoes are adapted to interlock with the beveled inner face of the flanged portion of clutch member 6. The teeth of the engaging faces are in axial alignment with the longitudinal center of platen shaft 1, and since the engaging faces are cooperatively beveled, the shoes can be readily slipped into interlocking engagement between the disk and cup-like member and as readily withdrawn from such interlocking engagement.

I speak of the parts 8 as shoes as in the drawings I show these parts as segments of a cylinder, each shoe having a T-shaped lug 10 intermediate of its ends located in a recess 11 in disk 7 so as to facilitate the removal and replacement of shoes and also allow the shoes a certain movement sufficient to properly find their positions and compensate for any imperfections in construction.

It is of course to be understood that I do not limit myself to any particular number of these shoes 8 as I may employ one continuous shoe or any desired number of segments, as desired.

On the outer end of the shaft 1 I locate a tubular shaft 12 on which a hub 13, preferably integral with disk 7, is mounted. A plate 14, secured to the inner end of the tubular shaft 12, is enclosed by the clutch members 6 and 7 and is adapted to abut the inner face of disk 7 whereby to withdraw the clutch member 7, as will more fully hereinafter appear.

15 represents a knob in which the tubular shaft 12 has turning movement and which is shown as provided with a series of recesses 16 affording guides for the lugs 17 on the end of the hub 13. With this construction the tubular shaft 12 and hub 13 can be given relative axial movement with respect to the platen shaft 1 and knob 15.

The hub 13 has an internal annular recess 18 in which a coiled spring 19 is housed, and this spring 19 bears at one end against the end of recess 18 and at its other end against knob 15. Thus the imprisoned spring 19 normally urges the disk 7 away from the knob 15 so as to slip the shoes 8 into interlocking engagement with the disk 9 and clutch member 6.

A removable screw 20 is screwed into the threaded portion 21 of integral knob 15 and has a pin 22 at its inner end which projects through a opening 23 in shaft 1 and through curved cam slots 24, 24 in opposite sides of the tubular shaft 12.

A knob or button 26 is secured on the outer end of tubular shaft 12 and is adapted to be gripped to give the tubular shaft a torsional movement. It will be evident that, since the pin 22 passes transversely through the curved slots 24, the tubular shaft cannot be given a straight endwise movement, nor a direct rotary movement. By the arrangement of parts, the tubular shaft can be moved only with a twisting or torsional action limitedly lengthwise of the platen shaft, and the extent of the curved cam slots 24 is merely sufficient to provide for a movement of the disk 7 into and out of a position in which the shoes will be interlocked with the cooperating clutch members.

The operation is as follows:

Figure 1 illustrates the parts in normal position, that is, with the clutch members 6 and 7 in operative engagement so as to compel the ratchet wheel 5 to turn with the platen 2 or vice versa. When variable line spacing is desired, the operator grasps the knob or button 26 and imparts a torsional movement to the tubular shaft 12, and, due to the curved cam slots 24, the walls of which engage pin 22, an outward longitudinal movement of said tubular shaft 12 is imparted. This outward movement of the shaft 12 draws the abutment plate 14 against the clutch member 7 and draws the clutch member 7 out of operative engagement with the clutch member 6, contracting the spring 19, as illustrated clearly in Figure 2.

When the parts are in the position shown in Figure 2 the cylinder or platen 2 can be freely turned for variable line spacing, the knob 15 being used in the usual way for turning the platen. When the operation of spacing is completed it is only necessary to twist the knob or button 26 slightly in the opposite direction from that which it has been formerly turned when the spring 19 will move the clutch member 7 to the right (Figure 2) and the shoe or shoes 8 will slip between the disk 9 and member 6 so that the clutch members are securely coupled or held.

Whether the tubular shaft be moved inwardly upon the platen shaft to the inner extremities of the cam slots or outwardly thereupon to the outer extremities of said cam slots, it will be held in the position to which it is moved, owing to the curved walls of the cam slots in connection with the frictional engagement therewith of the pin, induced by the action of the imprisoned spring. The extremities of the cam slots may also be formed to provide suitable dwell portions for the pin thereby further insuring that the tubular shaft will be maintained in the position to which it is moved.

By the arrangement described and illustrated, the adjustment of the platen for variable line spacing can easily and conveniently be effected by one hand, it being unnecessary to use one hand for manipulating the clutch and the other hand for holding the carriage stationary while the clutch is being manipulated.

As previously pointed out, no endwise thrusting movement is exerted upon the platen shaft, and owing to the provision of the cooperating teeth on the clutching parts, an interlocking action takes place which not only prevents slipping but which does not require any jamming action as is required in the use of the conventional friction clutches.

The clutch of my invention is operated by a mere twisting movement and by one hand without any endwise movement of the carriage.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. In a typewriting machine, consisting of a platen shaft with a clutch part and a ratchet with a clutch part, a tubular shaft movably mounted on the platen shaft, a third clutch part movable to and from a position in which it will interlock with each of the other clutch parts, said third clutch part being disposed on the tubular shaft, resilient means normally urging the third clutch part in one direction, means carried by the tubular shaft for engaging the third clutch part and by which through the operation of the tubular shaft to move the third clutch part against the urge of the resilient means, and means for causing said tubular shaft, when operated, to move in a combined tortional and axial direction between the platen shaft and third clutch part comprising a curved cam slot in said tubular member and a pin passing through said slot and engaging the platen shaft.

2. In a typewriting machine, consisting of a platen shaft with a clutch part and a ratchet with a clutch part, a third clutch part mounted to be advanced and retracted longitudinally of the shaft, all of said clutch parts having cooperating teeth, said third clutch part upon the advancement thereof being adapted to freely slide into interlocking engagement with the teeth of each of the other clutch parts for locking the shaft and ratchet together and upon the retraction thereof to freely slide out of such engagement for releasing the shaft, spring means normally acting to cause the advancement of the third clutch part, and controlling means arranged to prevent or permit the normal functioning of said spring means comprising a tubular member disposed for independent operation between the shaft and said third clutch part, a connection between said shaft and tubular member for causing the latter, when it is operated, to move in a combined torsional and axial direction so as to avoid imparting longitudinal thrusting movement to the shaft, and an abutment on said tubular member for engaging said third clutch part.

3. In a typewriting machine, consisting of a platen shaft with a clutch part and a ratchet with a clutch part, a third clutch part mounted for movement on the platen shaft, all of the clutch parts having cooperating teeth and the third clutch part being arranged to interlock with the teeth of each of the other clutch parts whereby to lock the platen shaft and ratchet together, spring means normally forcing the third clutch part into interlocking position, a knob connected by a pin with the platen shaft, a clutch control comprising a tubular shaft having turning fit between the knob and platen shaft, said tubular shaft having therein a slot through which said pin transversely passes, said slot being curved to force torsional movement of said tubular shaft when the latter is turned, and an abutment on said tubular shaft adapted to engage and move the third clutch member against the resistance of the spring means and hence out of engagement with each of the other clutch parts, as said tubular shaft is given a torsional movement in one direction.

4. In a typewriting machine, consisting of a platen shaft with a clutch part, a ratchet with a clutch part, a knob connected by a pin with the platen shaft whereby to turn the last named, a third clutch part mounted for movement on the platen shaft, all of the clutch parts having cooperating teeth and the third clutch part being arranged to interlock with the teeth of each of the other clutch parts whereby to lock the platen shaft and ratchet together, a spring imprisoned between the third clutch part and the knob normally forcing the third clutch part into interlocking position, a clutch control comprising a tubular shaft having turning fit between the knob and platen shaft, said tubular shaft having slots therein at opposite sides receiving said pin, said slots being curbed to force torsional movement of said tubular shaft when the latter is turned, an abutment on said tubular shaft adapted to engage and move the third clutch member in a direction to compress said spring and hence in a direction out of engagement with each of the other clutch parts, said spring when compressed being adapted to maintain the walls of the curved slots in frictional engagement with the pin to secure the tubular shaft against movement other than torsional movement.

Signed at New York in the county of New York and State of New York this 23rd day of March, A. D. 1928.

EMMET T. HARNEY.